(12) United States Patent
Jung et al.

(10) Patent No.: US 10,039,102 B2
(45) Date of Patent: Jul. 31, 2018

(54) METHOD FOR PERFORMING A TRANSMISSION ON A SIDELINK SUBFRAME AND WIRELESS DEVICE THEREOF

(71) Applicant: LG ELECTRONICS INC., Seoul (KR)

(72) Inventors: Manyoung Jung, Seoul (KR); Yoonoh Yang, Seoul (KR); Sangwook Lee, Seoul (KR); Suhwan Lim, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/675,009

(22) Filed: Aug. 11, 2017

(65) Prior Publication Data

US 2018/0063839 A1    Mar. 1, 2018

Related U.S. Application Data

(60) Provisional application No. 62/379,227, filed on Aug. 24, 2016.

(51) Int. Cl.
*H04W 72/04* (2009.01)
*H04W 76/02* (2009.01)
*H04W 72/12* (2009.01)
*H04W 76/14* (2018.01)
*H04W 76/04* (2009.01)

(Continued)

(52) U.S. Cl.
CPC ... *H04W 72/0446* (2013.01); *H04W 72/0406* (2013.01); *H04W 72/1289* (2013.01); *H04W 76/023* (2013.01); *H04W 76/14* (2018.02); *H04W 72/10* (2013.01); *H04W 76/048* (2013.01); *H04W 76/28* (2018.02)

(58) Field of Classification Search
CPC ......... H04W 72/0446; H04W 72/0406; H04W 76/023; H04W 72/1289; H04W 72/10; H04W 76/048
See application file for complete search history.

(56) References Cited

U.S. PATENT DOCUMENTS 9,893,855 B2 * 2/2018 Kim ...................... H04L 5/0048
2016/0044618 A1 * 2/2016 Sheng ............... H04W 56/0005
370/329
2016/0219620 A1 * 7/2016 Lee ....................... H04W 72/04

(Continued)

*Primary Examiner* — Jay P Patel
(74) *Attorney, Agent, or Firm* — Birch, Stewart, Kolasch & Birch, LLP

(57) ABSTRACT

The disclosure of the present invention proposes a method for performing a transmission on a sidelink subframe. The method may comprise: performing the transmission on the sidelink subframe. The sidelink subframe may include a plurality of symbols in a time domain, each of which includes a plurality of resource elements (REs) in a frequency domain. The transmission may include transmitting at least one of a first data signal and a first reference signal (RS), which is repeated in one or more REs in a last symbol with a periodicity of $N_{RPT\_L}$, The one or more REs having the periodicity of $N_{RPT\_L}$ in the last symbol may have a boosted transmit power for transmitting the at least one of the first data signal and the first RS.

10 Claims, 15 Drawing Sheets

(51) Int. Cl.
*H04W 72/10* (2009.01)
*H04W 76/28* (2018.01)

(56) References Cited

U.S. PATENT DOCUMENTS

| | | | |
|---|---|---|---|
| 2017/0019887 A1* | 1/2017 | Jiang | H04W 72/042 |
| 2017/0111923 A1* | 4/2017 | Nogami | H04W 72/1263 |
| 2017/0188391 A1* | 6/2017 | Rajagopal | H04W 74/0816 |
| 2017/0265155 A1* | 9/2017 | Kim | H04W 56/001 |
| 2017/0289908 A1* | 10/2017 | Lee | H04W 52/0219 |
| 2017/0295601 A1* | 10/2017 | Kim | H04W 76/023 |
| 2017/0303215 A1* | 10/2017 | Kim | H04W 52/38 |
| 2017/0325243 A1* | 11/2017 | Yasukawa | H04W 72/085 |
| 2017/0332390 A1* | 11/2017 | Li | H04L 5/0048 |

* cited by examiner

METHOD FOR PERFORMING A TRANSMISSION ON A SIDELINK SUBFRAME AND WIRELESS DEVICE THEREOF

This application claims the benefit of priority of U.S. Provisional Application No. 62/379,227 filed on Aug. 24, 2016, which is incorporated by reference in its entirety herein.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

There is a need for communication between pieces of UE located at a physically close distance, that is, device to device (D2D) communication, due to an increase of user needs for social network service (SNS).

D2D communication may be performed between pieces of UE located in coverage of a base station or may be performed between pieces of UE located out of coverage of the base station. Furthermore, D2D communication may be performed between UE located out of coverage of a base station and UE located in coverage of the base station.

Contents regarding D2D may be applied to vehicle-to-everything (V2X). V2X generally refers to a communication technology through a vehicle and all of interfaces. An implementation form of V2X may be various, such as vehicle-to-vehicle (V2V), vehicle-to-infrastructure (V2I), vehicle-to-person (V2P), and vehicle-to-network (V2N).

Meanwhile, the above V2X technology uses a sidelink (that is, D2D communication) technology. In an existing sidelink (that is, D2D communication) technology, for hardware restriction of UE and coexistence with existing LTE/LTE-A communication, a V2X UE does not use a first symbol OFDM/SC-FDMA symbol and a final symbol OFDM/SC-FDMA symbol of a subframe.

As described above, since the V2X UE cannot use the first symbol OFDM/SC-FDMA symbol and the final symbol OFDM/SC-FDMA symbol of a subframe, performance restriction, that efficiency of frequency spectrum is limited.

SUMMARY OF THE INVENTION

Accordingly, an object of the present invention is to solve the above-mentioned problems.

To achieve the foregoing purposes, the disclosure of the present invention proposes a method for performing a transmission on a sidelink subframe. The method may comprise: performing the transmission on the sidelink subframe. The sidelink subframe may include a plurality of symbols in a time domain, each of which includes a plurality of resource elements (REs) in a frequency domain. The transmission may include transmitting at least one of a first data signal and a first reference signal (RS), which is repeated in one or more REs in a last symbol with a periodicity of $N_{RPT\_L}$. The one or more REs having the periodicity of $N_{RPT\_L}$ in the last symbol may have a boosted transmit power for transmitting the at least one of the first data signal and the first RS.

The transmit power of the one or more REs may be boosted by multiplying a normal power of other REs by $N_{RPT\_L}$.

The one or more REs having the periodicity of $N_{RPT\_L}$ may not punctured in the last symbol.

The transmission may include transmitting at least one of a second data signal and a second RS, which is repeated in one or more REs in a first symbol with a periodicity of $N_{RPT\_0}$.

The one or more REs having the periodicity of $N_{RPT\_0}$ in the first symbol may have a boosted transmit power. The transmit power of the one or more REs in the first symbol may be boosted by multiplying a normal power of other REs by $N_{RPT\_0}$.

To achieve the foregoing purposes, the disclosure of the present invention proposes a wireless device for performing a transmission on a sidelink subframe. The wireless device may comprise: a transceiver; and a processor operatively connected to the transceiver and to perform the transmission on the sidelink subframe. The sidelink subframe may include a plurality of symbols in a time domain, each of which includes a plurality of resource elements (REs) in a frequency domain. The transmission may include transmitting at least one of a first data signal and a first reference signal (RS), which is repeated in one or more REs in a last symbol with a periodicity of $N_{RPT\_L}$. The one or more REs having the periodicity of $N_{RPT\_L}$ in the last symbol may have a boosted transmit power for transmitting the at least one of the first data signal and the first RS.

According to the disclosure of the present invention, the problem of the conventional technology described above may be solved.

DESCRIPTION OF EXEMPLARY EMBODIMENTS

Figure 1:
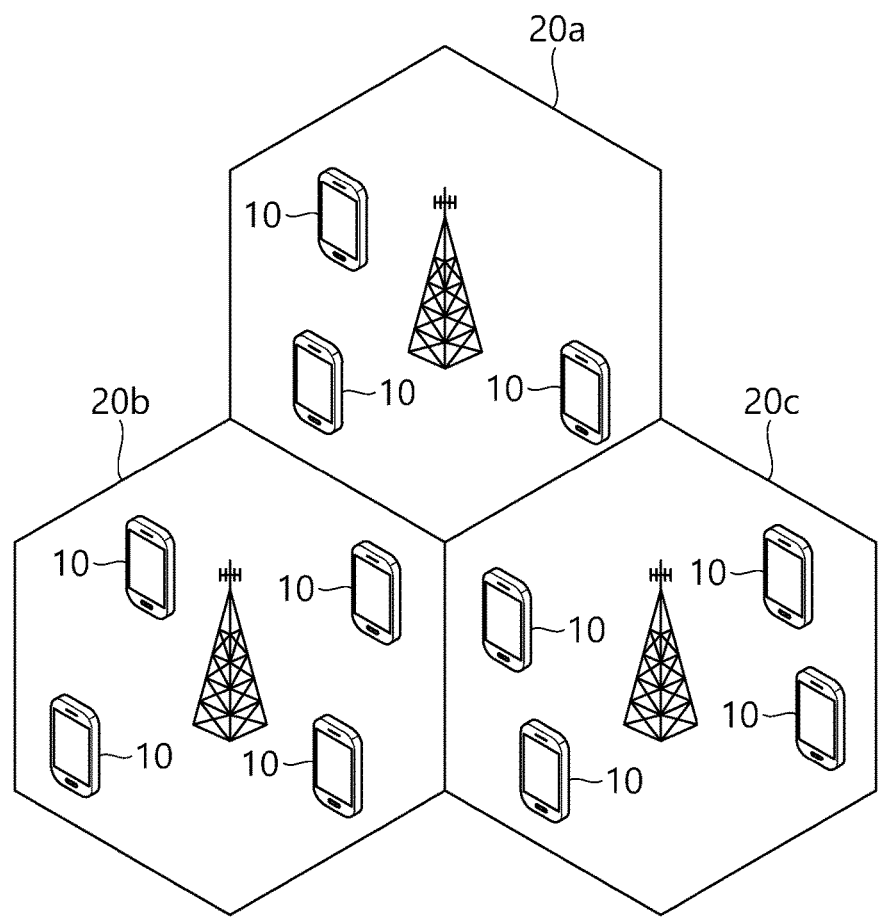
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
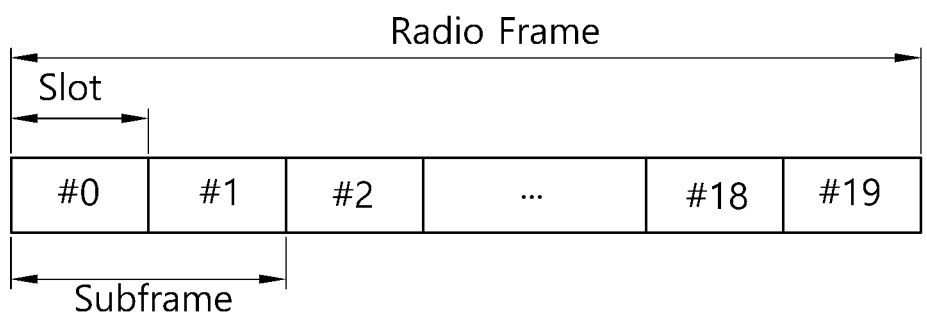
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
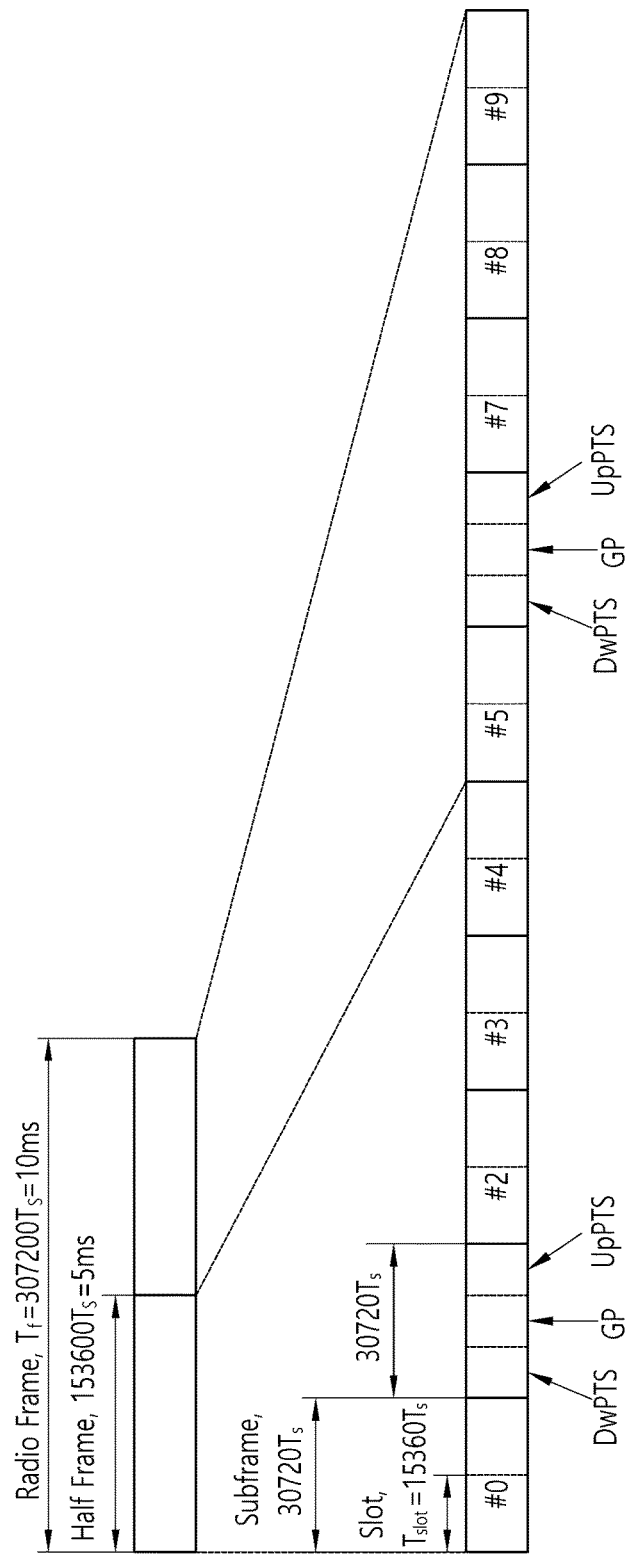
FIG. 3 illustrates a structure of a downlink radio frame according to TDD in the 3GPP LTE.

FIG. 3 illustrates the architecture of a downlink radio frame according to TDD in 3GPP LTE.

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
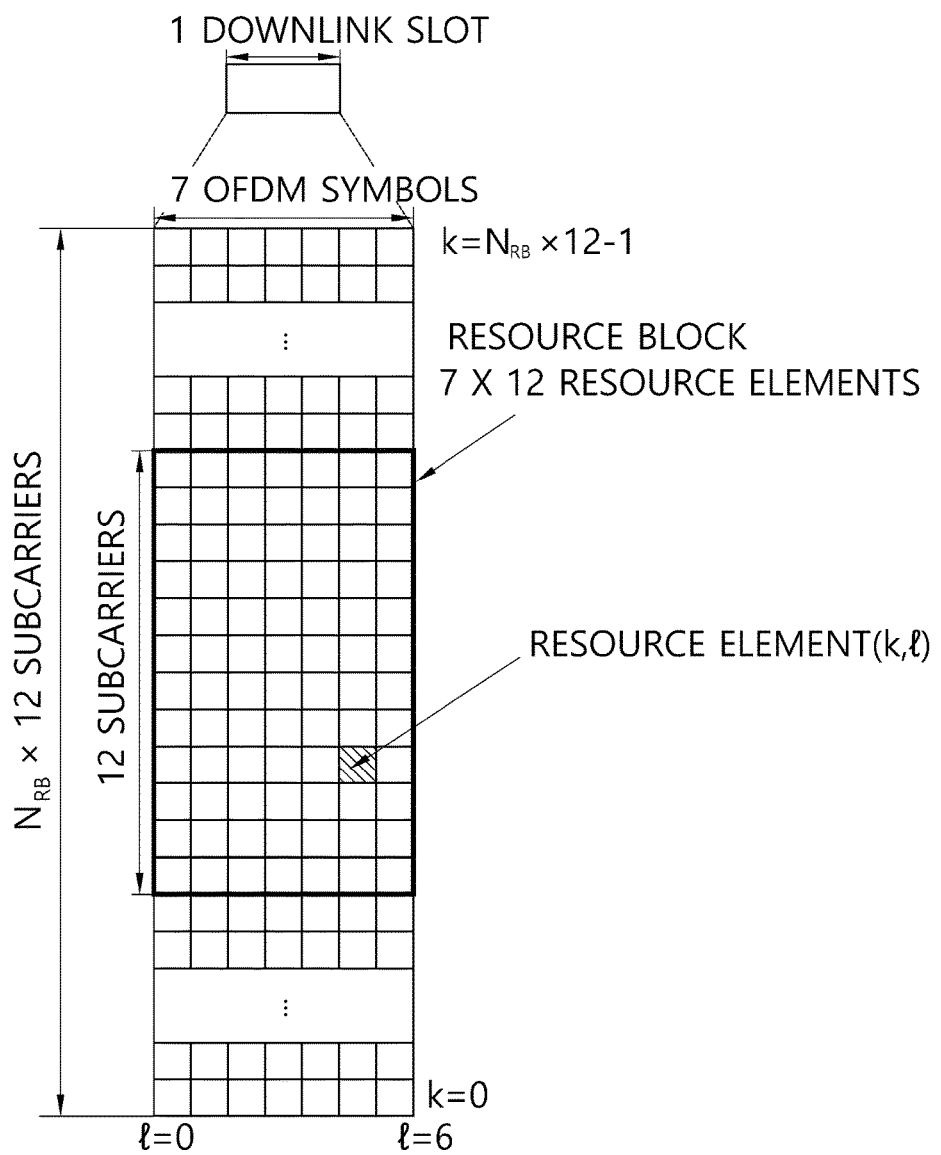
FIG. 4 is an exemplary diagram illustrating a resource grid for one uplink or downlink slot in the 3GPP LTE.

FIG. 4 illustrates an example resource grid for one uplink or downlink slot in 3G PP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
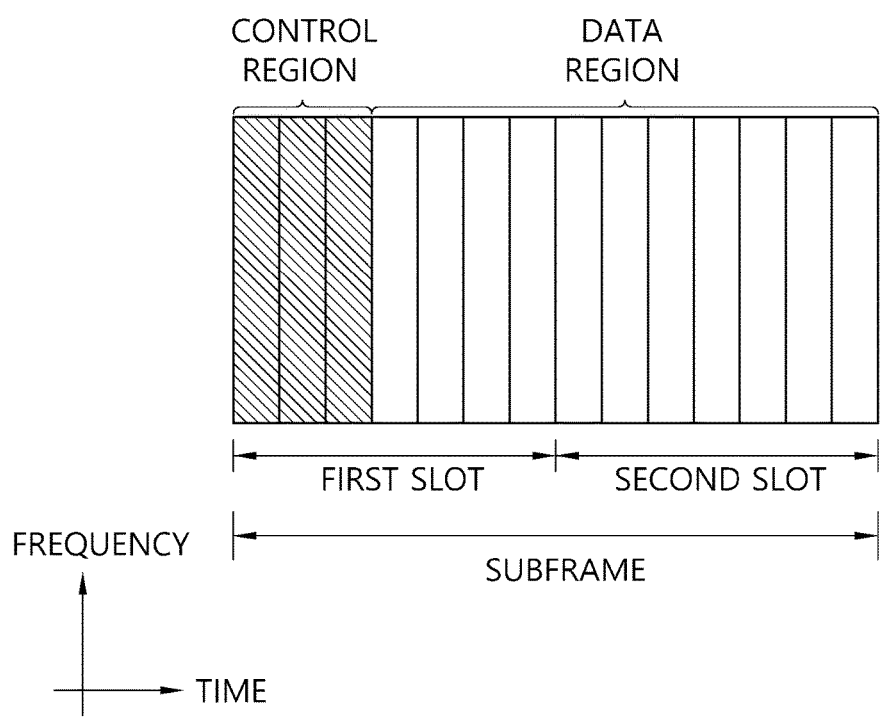
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
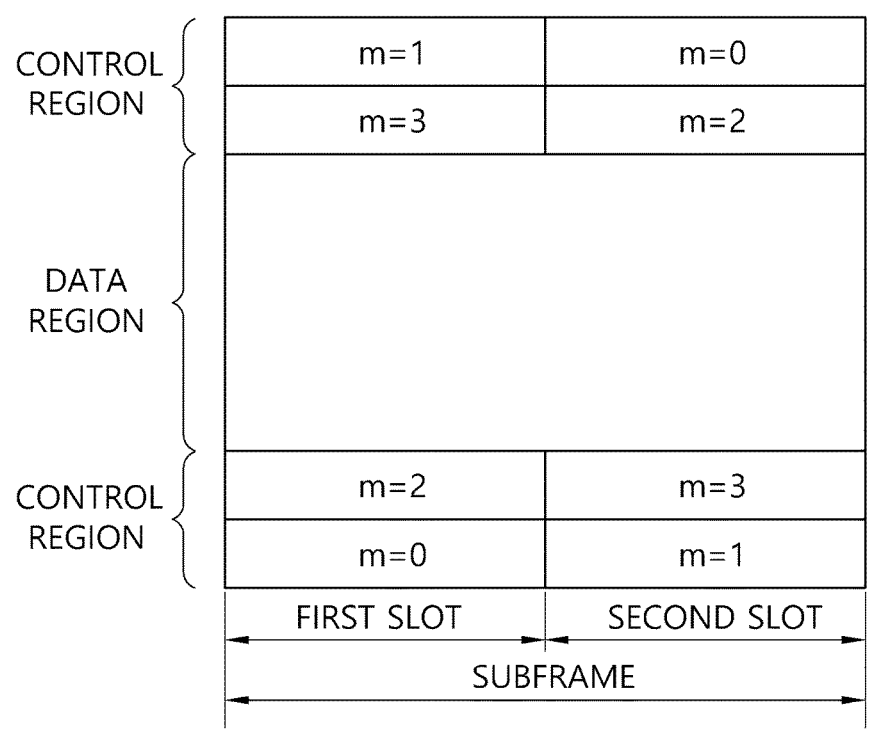
FIG. 6 illustrates the architecture of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Device to Device (D2D) Communication>

D2D communication which is expected to be introduced into a next-generation communication system is described below.

Figure 7:
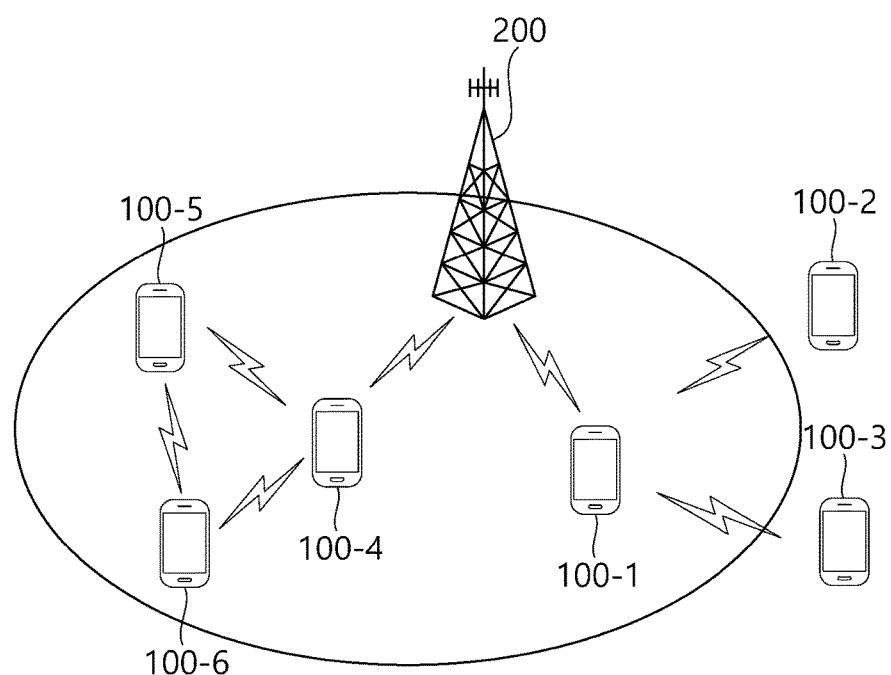
FIG. 7 shows the concept of device to device (D2D) communication which is expected to be introduced into a next-generation communication system.

FIG. 7 shows the concept of device to device (D2D) communication which is expected to be introduced into a next-generation communication system.

There is a need for communication between pieces of UE located at a physically close distance, that is, device to device (D2D) communication, due to an increase of user needs for social network service (SNS).

Figure 8:
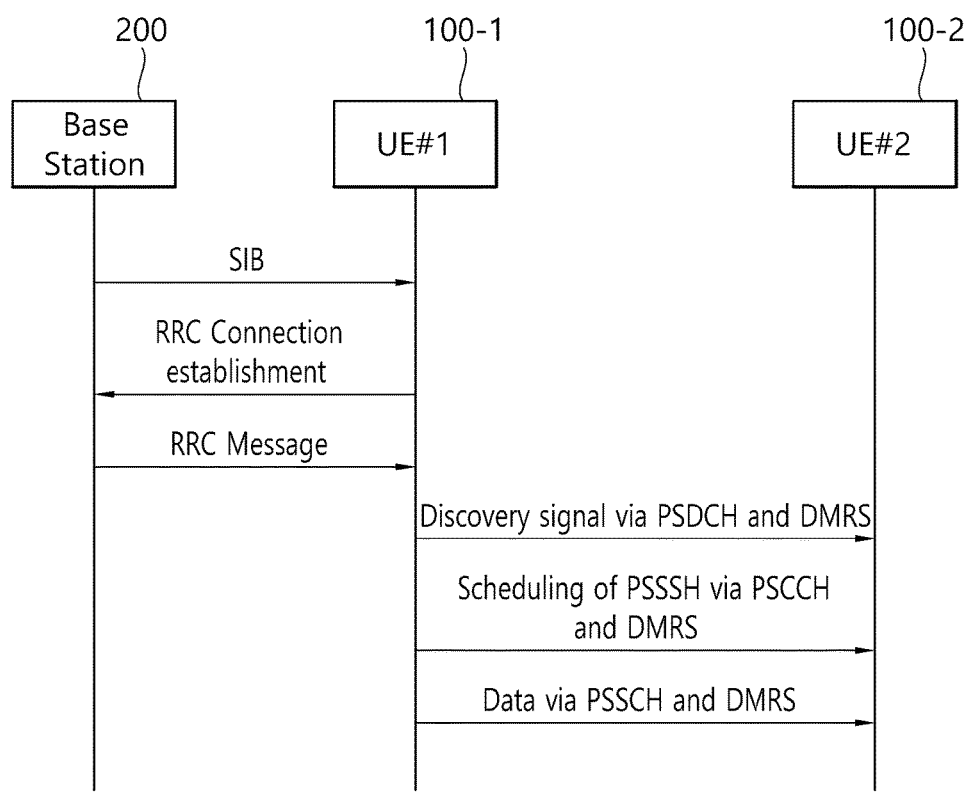
FIG. 8 shows an example of D2D communication or ProSe communication between UE#1 and UE#2 shown in FIG. 7.

In order to reflect the aforementioned needs, as shown in FIG. 8, a scheme for direct communication between UE#1 100-1, UE#2 100-2, and UE#3 100-3 or between UE#4 100-4, UE#5 100-5, and UE#6 100-6 without the intervention of an eNodeB (eNB) 200 is being discussed. The UE#1 100-1 and the UE#4 100-4 may directly communicate with each other with the help of the base station 200. The UE#4 100-4 may play the role of a relay node for the UE#5 100-5 and the UE#6 100-6. Likewise, the UE#1 100-1 may play the role of a relay node for the UE#2 100-2 and the UE#3 100-3 which are located far from the center of a cell.

D2D communication is also called a proximity service (ProSe). Furthermore, UE that performs a ProSe is also called ProSe UE. Furthermore, a link between pieces of UE used for the D2D communication is also called a sidelink. A frequency band which may be used in the sidelink is as follows.

TABLE 3

| Sidelink band | E-UTRA band | Transmission $F_{UL\_low}$-$F_{UL\_high}$ | Reception $F_{DL\_low}$-$F_{DL\_high}$ | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used in the sidelink are as follows.
A physical sidelink shared channel (PSSCH)
A physical sidelink control channel (PSCCH)
A physical sidelink discovery channel (PSDCH)
A physical sidelink broadcast channel (PSBCH)
Furthermore, physical signals used in the sidelink are as follows.
A demodulation reference signal (DMRS)
A sidelink sync signal (SLSS)
The SLSS includes a primary sidelink sync signal (PSLSS) and a secondary sidelink sync signal (SSLSS).

FIG. 8 shows an example of D2D communication or ProSe communication between UE#1 and UE#2 shown in FIG. 7.

Referring to FIG. 8, the base station 200 broadcasts a system information block (SIB) to the cell.

The SIB may include information about a resource pool related to D2D communication.

The information about a resource pool related to D2D communication may be divided into an SIB type 18 and an SIB type 19.

The SIB type 18 may include resource configuration information for D2D communication. Furthermore, the SIB type 19 may include resource configuration information for D2D discovery.

The SIB type 19 includes discSyncConfig as follows.

TABLE 4

| | SIB type 19 |
|---|---|
| discSyncConfig | Indicates a configuration regarding whether UE is permitted to receive or transmit sync information. A base station (E-UTRAN) may configure discSyncConfig when UE attempts to send sync information using dedicated signaling. |

The discSyncConfig includes SL-SyncConfig. The SL-SyncConfig includes configuration information for the reception of an SLCC and the transmission of an SLSS as in the following table.

TABLE 5

| | Description of an SL-SyncConfig field |
|---|---|
| discSyncWindow | It is also called a searching window. It indicates a sync window that UE expects an SLSS. The value may be set to w1 or w2. The value w1 indicates 5 milliseconds, and the value w2 corresponds to a length obtained by dividing a normal CP by 2. |
| syncTxPeriodic | It indicates whether UE sends an SLSS once or periodically (e.g., every 40 ms) within each period of a discovery signal transmitted by the UE. In the case of periodical transmission, UE also sends MasterInformationBlock-SL. |
| syncTxThreshIC | It indicates a threshold value used in coverage. If an RSRP value measured with respect to counterpart UE (recognized like a cell) selected for sidelink communication is lower than the threshold value, UE may send an SLCC for sidelink communication with the counterpart UE. |
| txParameters | It includes the parameter of a configuration for transmission. |

The UE#1 100-1 located in coverage of the base station 200 establishes RRC connection with the base station 200.

Furthermore, the UE#1 100-1 receives an RRC message, for example, an RRC Connection Reconfiguration message from the base station 200. The RRC message includes a discovery configuration (hereinafter referred to as "discConfig"). The discConfig includes configuration information about a discover resource pool (hereinafter referred to as "DiscResourcePool"). The DiscResourcePool includes information listed in the following table.

TABLE 6

| | DiscResourcePool |
|---|---|
| discPeriod | It may also be indicated as a discovery period and may also be called a PSDCH period, that is, the period of a resource allocated within a cell for the transmission/reception of a discovery message. The value may be rf32, rf64, rf128, rf256, rf512, or rf1024. Such a value indicates the number of radio frames. That is, when the value is rf32, it indicates 32 radio frames. |
| numRepetition | It indicates a number value that subframeBitmap to be mapped to a subframe generated within the discPeriod is repeated. A base station configures the numRepetition and the subframeBitmap so that the mapped subframe does not exceed the discPeriod. |
| TF-ResourceConfig | It designates a set of time/frequency resources used for sidelink communication. |

The TF-ResourceConfig includes information listed in the following table.

TABLE 7

| SL-TF-ResourceConfig-r12 ::= | SEQUENCE { |
|---|---|
| prb-Num-r12 | INTEGER (1..100), |
| prb-Start-r12 | INTEGER (0..99), |
| prb-End-r12 | INTEGER (0..99), |
| offsetIndicator-r12 | SL-OffsetIndicator-r12, |
| subframeBitmap-r12 | SubframeBitmapSL-r12 |
| } | |

The SubframeBitmapSL is the same listed in the following table.

TABLE 8

| SubframeBitmapSL | It may also be indicated as discoverySubframeBitmap and designates a subframe bitmap indicative of a resource used in a sidelink. The value may be designated as bs4, bs8, bs12, bs16, bs30, bs40 or bs40. For example, the value bs40 means a bit string length of 40. |
|---|---|

The SL-OffsetIndicator includes information listed in the following table.

TABLE 9

| SL-OffsetIndicator | It may also be indicated as discoveryOffsetIndicator and indicates an offset of the first period of a resource pool within an SFN cycle. |
|---|---|
| SL-OffsetIndicatorSync | It may also be indicated as SyncOffsetIndicator and indicates a relation between SFNs and a subframe included in a sync resource according to an equation. (SFN * 10 + Subframe Number) mod 40 = SL-OffsetIndicatorSync. |

In order for the UE#1 100-1 to discover suitable UE nearby for D2D communication or ProSe communication or in order for the UE#1 100-1 to provide notification of its presence, it may send a discovery signal through a PSDCH.

Furthermore, the UE#1 100-1 may send scheduling assignment (SA) through a PSCCH. Furthermore, the UE#1 100-1 may send a PSSCH including data based on the scheduling assignment (SA).

Figure 9:
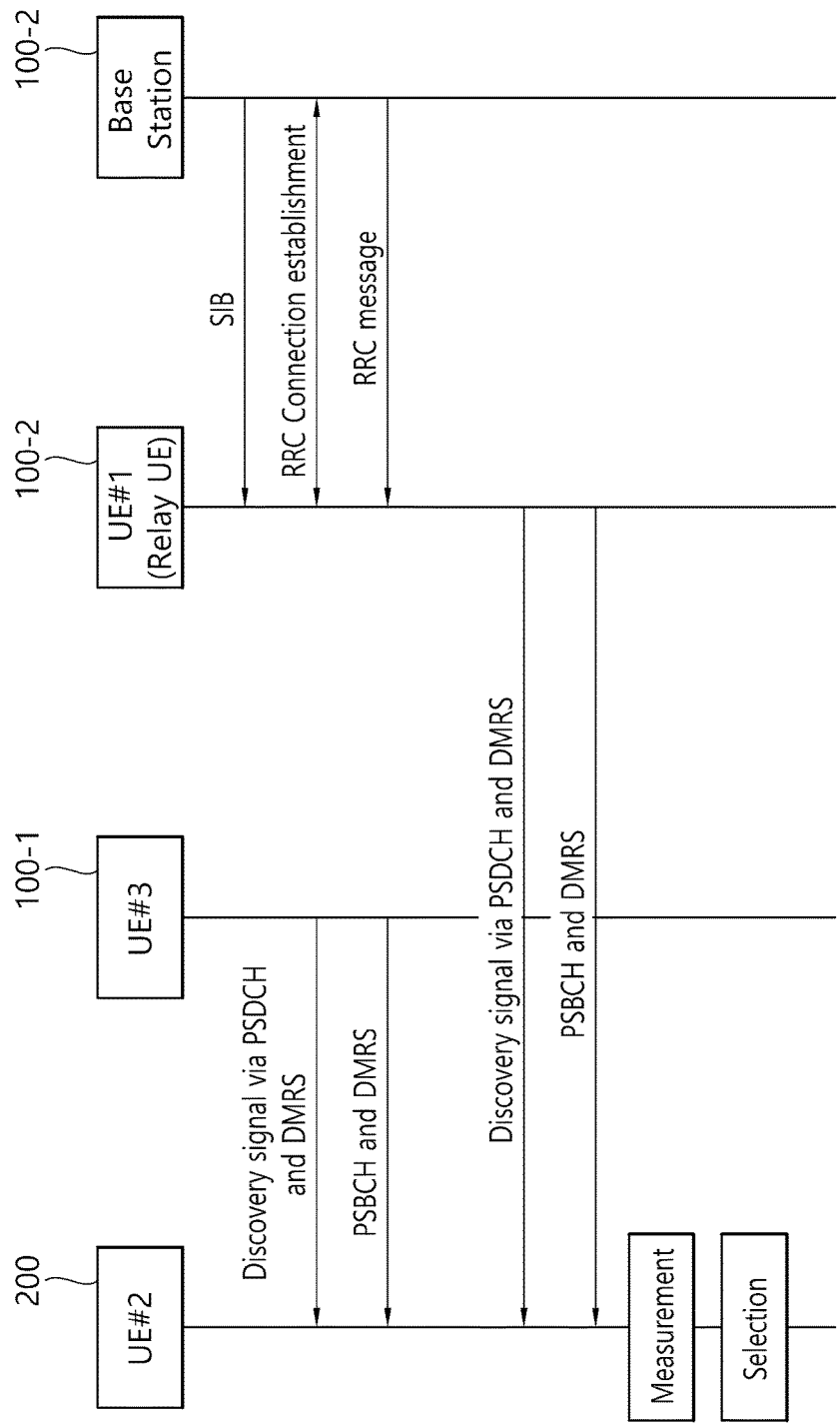
FIG. 9 shows an example in which the UE#2 selects relay UE in FIG. 7.

FIG. 9 shows an example in which the UE#2 selects relay UE in FIG. 7.

Referring to FIG. 9 along with FIG. 7, the UE#2 100-2 located out of coverage of the base station receives a discovery signal and a DMRS for the demodulation of the discovery signal from adjacent pieces of UE in order to perform D2D communication with the UE#1 100-1 which is located in coverage of the base station and may operate as relay UE. Furthermore, the UE#2 100-2 receives a PSBCH and a DMRS for the demodulation of the PSBCH from adjacent pieces of UE.

Accordingly, the UE#2 100-2 performs measurement based on the received signals.

The measurement includes the measurement of sidelink reference signal received power (S-RSRP) and the measurement of sidelink discovery reference signal received power (SD-RSRP).

In this case, the S-RSRP means average received power on a resource element (RE) including the DMRS for the demodulation of the PSBCH received within 6 PBBs in the middle. In this case, power per RE is determined based on energy received on a portion other than the CP portion of an OFDM symbol.

The SD-RSRP means average received power on an RE including a DMRS for the demodulation of a PSDCH if a CRC check is successful depending on the successful decoding of the PSDCH including the discovery signal.

When the measurement is completed, the UE#2 100-2 selects the UE#1 100-1 which may operate as relay UE based on a result of the measurement, that is, a result of the measurement of the SD-RSRP.

<Vehicle-to Everything (V2X)>

The contents regarding D2D may also be applied to vehicle-to-everything (V2X). V2X collectively refers to a communication technology through a vehicle and all of interfaces. An implementation form of V2X may be as follows.

First, in V2X, "X" may be a vehicle. In this case, V2X may be indicated as vehicle-to-vehicle (V2V) and may mean communication between vehicles.

Figure 10:
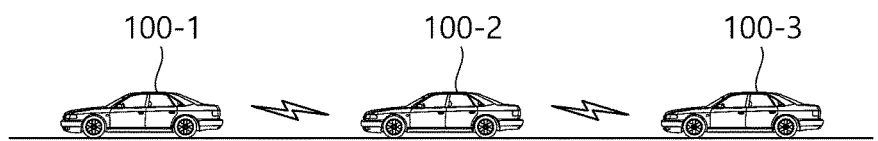
FIG. 10 is an exemplary diagram showing the concept of V2X.

FIG. 10 is an exemplary diagram showing the concept of V2X.

As may be seen with reference to FIG. 10, vehicles (i.e., radio devices 100-1, 100-2, and 100-3 mounted on the vehicles) may perform mutual communication.

In V2X, "X" may mean a person or a pedestrian. In this case, V2X may be indicated as a vehicle-to-person or vehicle-to-pedestrian (V2P). In this case, the pedestrian is not necessarily limited to a person who walks, but may include a person who rides a bicycle and a driver or passenger on a (specific speed or less) vehicle.

Alternatively, "X" may mean an infrastructure/network. In this case, V2X may be indicated as vehicle-to-infrastructure (V2I) or a vehicle-to-network (V2N), and may mean communication between a vehicle and a roadside unit (RSU) or between a vehicle and a network. The RSU may be traffic-related infrastructure, for example, a device that provides notification of speed. The RSU may be implemented in a base station or fixed UE.

Meanwhile, the above V2X technology uses a sidelink (that is, D2D communication) technology. In an existing sidelink (that is, D2D communication) technology, for hardware restriction of UE and coexistence with existing LTE/LTE-A communication, a V2X UE does not use a first symbol OFDM/SC-FDMA symbol and a final symbol OFDM/SC-FDMA symbol of a subframe. The above will be described in detailed as follows.

After Sidelink meaning communication between UEs in 3GPP is firstly introduced from D2D of Rel-12, the sidelink is recently applied to eD2D and V2V. However, due to coexistence with uplink and restriction of UE RF HW on an LTE Network, there are several restrictions as follows.

First, a final OFDM/SC-FDMA symbol in a subframe is not transmitted in order to prevent UL/DL collision upon coexistence with existing LTE/LTE-A communication. Further, one Tx RF chain inside UE is commonly used for sidelink with LTE/LTE-A. A final OFDM/SC-FDMA symbol is not transmitted but is used as a switching time between the LTE/LTE-A and the sidelink.

Further, 1~2 OFDM/SC-FDMA symbols of a front part in the subframe may not be used by reception (Rx) automatic gain control (AGC) of reception UE (A gain control value may not be changed in a middle of the symbol in an OFDM/SC-FDMA based transmission scheme).

The above will be described in detail with reference to the accompanying drawings.

Figure 11A:
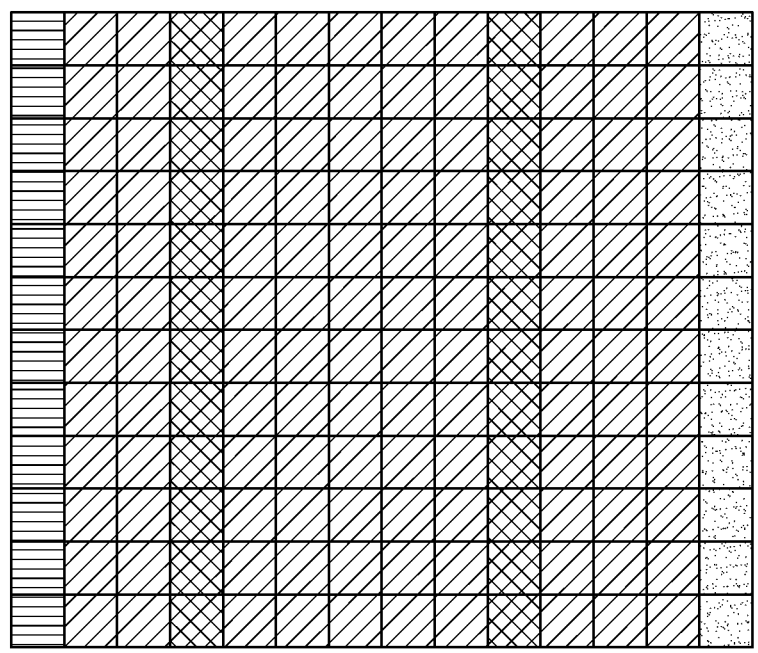
FIG. 11a illustrates a subframe used for D2D communication.
Figure 11B:
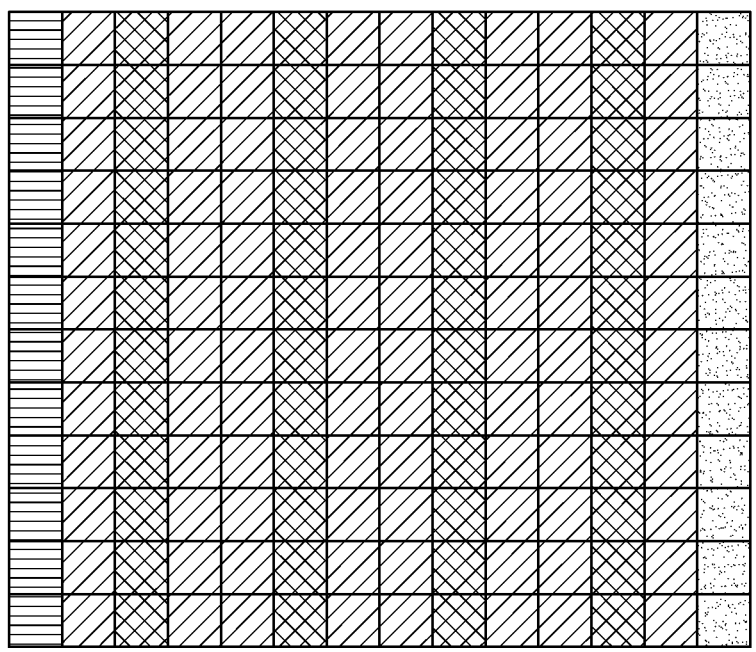
FIG. 11b illustrates a structure of a subframe used for V2V communication.

FIG. 11*a* illustrates a subframe used for D2D communication, and FIG. 11*b* illustrates a structure of a subframe used for V2V communication.

In FIG. 11*a*, third and ninth OFDM/SC-FDMA symbols in the subframe are used as a reference signal (RS). Further, in FIG. 11*b*, second, fifth, eighth, and eleventh OFDM/SC-FDMA symbols in the subframe are used as a reference signal (RS).

As shown in FIG. 11*a* and FIG. 11*b*, a transmission UE uses a first OFDM/SC-FDMA symbol expressed by $Data_0$ for transmission because of characteristic of a Sidelink. However, a reception UE uses the first OFDM/SC-FDMA symbol for Rx AGC. That is, the first OFDM/SC-FDMA symbol expressed by $Data_0$ is a symbol which may not be used for receiving real data in a baseband modem side of a reception UE.

Meanwhile, a final symbol expressed by $Data_L$ is used when the transmission UE performs channel coding, but is punctured not to be transmitted As described above, since the V2X UE cannot use the first OFDM/SC-FDMA symbol and the final OFDM/SC-FDMA symbol, efficiency of frequency spectrum is limited.

<Disclosure of the Specification>

The present invention has been made in an effort to provide a method of improving reception performance, increasing a transmission distance, and improving reliability.

In order to achieve the above objective, the specification repeats an RE in a first OFDM/SC-FDMA symbol or a final OFDM/SC-FDMA symbol in a specific pattern in a subframe used for V2X. Accordingly, the use of only RE repeated in a specific pattern in the first OFDM/SC-FDMA symbol or the final OFDM/SC-FDMA symbol is limited. Since other REs may be used, a performance gain may be obtained.

A detailed approach will be described in detail with reference to the accompanying drawings.

Figure 12:
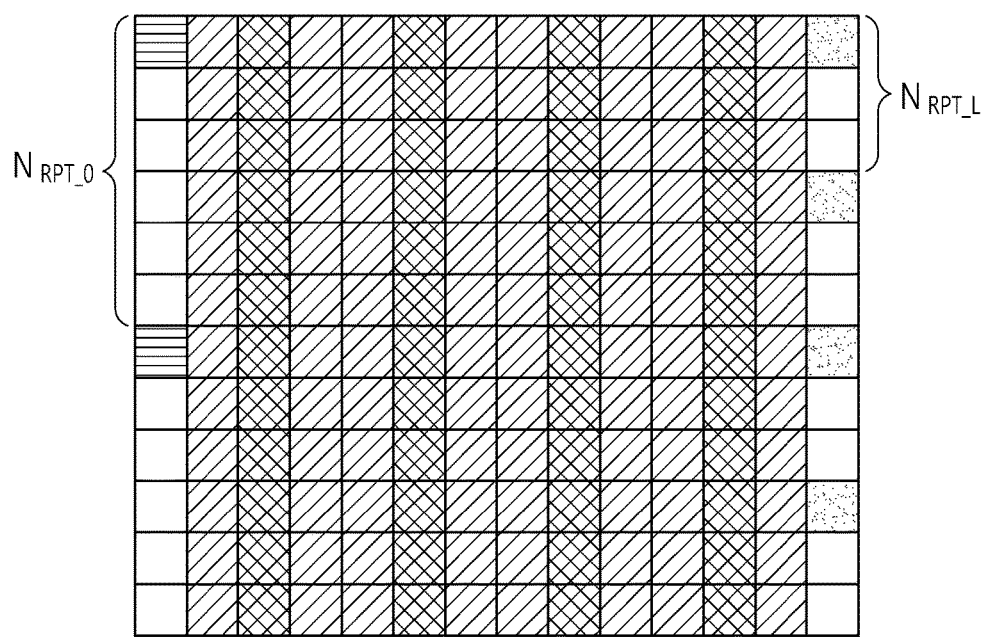
FIG. 12 illustrates a structure an improved structure of a V2X subframe according to a disclosure of the specification.

FIG. 12 illustrates a structure an improved structure of a V2X subframe according to a disclosure of the specification.

First, for convenience of description, the number of repletion times of a first RE in the first OFDM/SC-FDMA symbol refers to $N_{rpt1}$, and the number of Repetition times of a second RE in the final OFDM/SC-FDMA symbol refers to $N_{rpt2}$. The $N_{rpt1}$ and the $N_{rpt2}$ may be previously set or dynamically signaled according to a purpose of a system.

1. First OFDM/SC-FDMA Symbol

First, a specific signal is repeated in RE every NRPT_0 in the first OFDM/SC-FDMA symbol. That is, the same specific signal is repeatedly transmitted through Nrpt1 REs repeated every NRPT_0 in the first OFDM/SC-FDMA symbol. For example, a subframe shown in FIG. 12 includes 12 sub-carriers as one PRB based on a frequency axis.

In this case, NRPT_0 is 6, and Nrpt1 is 2.

In this case, in order to make transmission power in the first OFDM/SC-FDMA symbol to be the same as that of other OFDM/SC-FDMA symbol, transmission power of a corresponding RE is increased (boosted) by $N_{RPT\_0}$ to be transmitted.

The corresponding RE may be used to transfer a data signal or a reference signal (RS). In each case, following considerations may be additionally provided.

a) When the corresponding RE is used to transfer a data signal: Since only RE of entire usable REs reduced by a $N_{RPT\_0}$ rate may be used, performance is reduced. Accordingly, in order to recover the performance, a modulation scheme having an order higher than a generally used modulation scheme may be used. For example, if another OFDM/SC-FDMA symbol uses QPSK, 16QAM is applicable to a first OFDM/SC-FDMA symbol. In this case, if a transmission end uses a modulation scheme of a higher order, reception performance is deteriorated in a reception end. However, as described above, the transmission end applies power scaling of $N_{RPT\_0}$ instead of using a modulator scheme of a higher order to prevent a reception performance reduction in the reception end. In this case, an MCS table with respect to a power boosted RE may use a separately defined table.

b) When a corresponding RE is used to transfer a reference signal (RS): A reception end separately requires a frequency domain channel estimator but may increase a channel estimation performance. In particular, performance may be increased under a high (or high speed) Doppler environment.

Unlike the related art performing Rx AGC using the whole first symbol because of characteristics of an OFDM technology, according to a suggested method, a receiver may perform Rx AGC using only specific REs repeated by $N_{RPT\_0}$ times in a first symbol in a time domain. A time domain sample used to perform Rx AGC may perform an OFDM based reception operation reusing a value in a remaining domain. In this case, a value of $N_{RPT\_0}$ is designated by taking into consideration an operation of Rx AGC. For example, if a length of a training sample required in a generally implementable Rx AGC is $N_{RX\text{-}AGC\ Sample}$, the value of $N_{RPT\_0}$ is set by taking into consideration following conditions.

$$N_{Rx\text{-}AGC\ Sample} \leq N_{CP} = N_{FFT}/N_{RPT\_0} \quad \text{[Equation 1]}$$

2. Final OFDM/SC-FDMA Symbol

In a case of a final OFDM/SC-FDMA symbol of a subframe, a specific signal is repeated on an RE every NRPT_L. That is, the same specific signal is repeatedly transmitted through Nprt2 REs repeated every NRPT_L in the final OFDM/SC-FDMA symbol. For example, FIG. 12 illustrates that NRPT_L is 3, and Nprt2 is 4.

In this case, in order to make transmission power in the final OFDM/SC-FDMA symbol to be the same as that of other OFDM/SC-FDMA symbol, transmission power of a corresponding RE is increased (boosted) by NRPT_L to be transmitted.

The corresponding RE may be used to transfer a data signal or a reference signal (RS). In each case, following considerations may be additionally provided.

a) When the corresponding RE is used to transfer a data signal: Since only RE of entire usable REs reduced by a $N_{RPT\_L}$ rate may be used, performance is reduced. Accordingly, in order to recover the performance, a modulation scheme having an order higher than a generally used modulation scheme may be used. For example, if another OFDM/SC-FDMA symbol uses QPSK, 16QAM is applicable to a final OFDM/SC-FDMA symbol. In this case, if a transmission end uses a modulation scheme of a higher order, reception performance is deteriorated in a reception end. However, as described above, the transmission end applies power scaling of $N_{RPT\_L}$ instead of using a modulator scheme of a higher order to prevent a reception performance reduction in the reception end. In this case, an MCS table with respect to a power boosted RE may use a separately defined table.

b) When a corresponding RE is used to transfer a reference signal (RS): A reception end separately requires a frequency domain channel estimator but may increase a channel estimation performance. In particular, performance may be increased under a high (or high speed) Doppler environment.

As described above, the related art punctures the final OFDM/SC-FDMA symbol not to use it. According to a suggested method, a final one among signals (or time domain samples) repeated on an RE every NRPT_L. That is, signals may be transmitted except for signals repeated in NRPT_L−1 REs. For example, since NRPT_L is 3 and Nprt2=4 in FIG. 12, a repeated signal is controlled in 3−1=2 REs and only signals in two REs are transmitted. In this case, the NRPT_L is set by taking into consideration a maximum timing advance (TA) value created from uplink, and may be set by taking into consideration following conditions.

$$\max(N_{TA} + N_{TA\ Offset}) \leq N_{FFT}/N_{RPT\_L} \quad \text{[Equation 2]}$$

Meanwhile, a radio frame structure of sidelink uses the same radio frame structure of an existing LTE/LTE-A. However, if it is considered that coverage of the sidelink is less than coverage of an existing LTE/LTE-A, Maximum channel transmission delay (NMax Delay) of sidelink with respect to an OFDM/SC-FDMA symbol received by UE is regarded as a CP domain, and an FFT boundary may be set forward. As described above, if the FFT boundary is set forward, more valid time domain samples may be kept. In particular, in the final OFDM/SC-FDMA symbol, an SRN may be increased or a value of NRPT_L may be additionally ensured. A concept of the SNR increase is described with reference to the accompanying drawings as follows.

Figure 13:
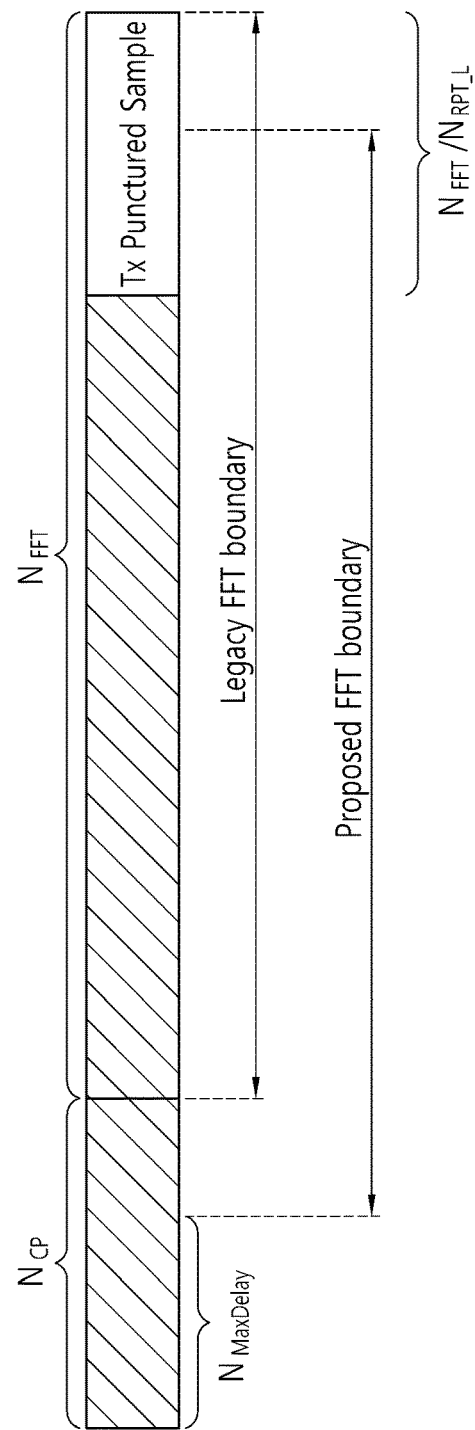
FIG. 13 illustrates an FFT boundary in a final OFDM/SC-FDMA symbol.

FIG. 13 illustrates an FFT boundary in a final OFDM/SC-FDMA symbol.

As illustrated referring to FIG. 13, a ratio of punctured data to valid data (Data in the FFT Boundary) may increase a suggested FFT boundary as compared with an existing FFT boundary. Accordingly, the suggested FFT boundary may increase the SNR in a corresponding symbol. When an FFT boundary is changed, a type of timing offset occurs in a reception UE side. The value is compensated by a Timing offset estimator included in a receiver. Accordingly, the performance is not deteriorated.

By using the above method, the first OFDM/SC-FDMA symbol and the final OFDM/SC-FDMA symbol which may not be used in the related art is partially used to transmit a data signal or a reference signal so that reliable communication having performance gain and increased communication distance is possible.

The above embodiments of the present invention may be implemented by various means. For example, embodiments of the present invention may be implemented by hardware, firmware, software, and a combination thereof. The embodiments of the present invention will be described with reference with the accompanying drawings.

Figure 14:
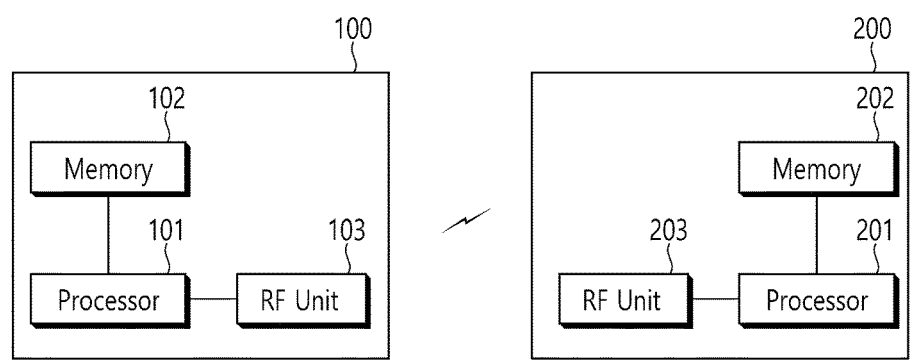
FIG. 14 is a block diagram illustrating a wireless communication system according to a disclosure of the specification.

FIG. 14 is a block diagram showing a wireless communication system according to an embodiment of the present invention.

A base station 200 includes a processor 201, a memory 202, and a radio frequency (RF) unit 203. The memory 202 is coupled to the processor 51 to store a variety of information for driving the processor 201. The RF unit 203 is coupled to the processor 201 to transmit and/or receive a radio signal. The processor 201 implements the proposed functions, procedures, and/or methods. In the aforementioned embodiment, an operation of the BS or a cell may be implemented by the processor 201.

A UE 100 includes a processor 101, a memory 102, and an RF unit 103. The memory 102 is coupled to the processor 101 to store a variety of information for driving the processor 101. The RF unit 103 is coupled to the processor 101 to transmit and/or receive a radio signal. The processor 101 implements the proposed functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a transmission on a sidelink subframe, the method comprising:
performing the transmission on the sidelink subframe,
wherein the sidelink subframe includes a plurality of symbols in a time domain, each of which includes a plurality of resource elements (REs) in a frequency domain,
wherein the performing the transmission includes transmitting a first data signal or a first reference signal (RS) in a last symbol of the sidelink subframe,
wherein the transmitting the first data signal or the first RS is repeated in one or more REs with a periodicity of $N_{RPT\_L}$, and
wherein the one or more REs through which the first data signal or the first RS is transmitted in the last symbol have a boosted transmit power than a normal power of other REs.

2. The method of claim 1, wherein the transmit power of the one or more REs is boosted by multiplying the normal power of the other REs by $N_{RPT\_L}$.

3. The method of claim 1, wherein the one or more REs having the periodicity of $N_{RPT\_L}$ are not punctured in the last symbol.

4. The method of claim 1, wherein the performing the transmission further includes transmitting a second data sin or a second RS in a first symbol of the sidelink subframe,
wherein the transmitting the second data signal or the second RS is repeated in one or more REs with a periodicity of $N_{RPT\_0}$.

5. The method of claim 4,
wherein the one or more REs having the periodicity of $N_{RPT\_0}$ in the first symbol have a boosted transmit power than the normal power of the other REs, and
wherein the transmit power of the one or more REs having the periodicity of $N_{RPT\_0}$ in the first symbol is boosted by multiplying the normal power of the other REs by $N_{RPT\_0}$.

6. A wireless device for performing a transmission on a sidelink subframe, the wireless device comprising:
a transceiver; and
a processor operatively connected to the transceiver and configured to perform the transmission on the sidelink subframe,
wherein the sidelink subframe includes a plurality of symbols in a time domain, each of which includes a plurality of resource elements (REs) in a frequency domain,
wherein the transmission is performed by transmitting a first data signal or a first reference signal (RS) in a last symbol of the sidelink subframe,
wherein the transmitting the first data signal or the first RS is repeated in one or more REs with a periodicity of $N_{RPT\_L}$, and
wherein the one or more REs through which the first data signal or the first RS is transmitted in the last symbol have a boosted transmit power than a normal power of the other REs.

7. The wireless device of claim 6, wherein the transmit power of the one or more REs is boosted by multiplying the normal power of the other REs by $N_{RPT\_L}$.

8. The wireless device of claim 6, wherein the one or more REs having the periodicity of $N_{RPT\_L}$ are not punctured in the last symbol.

9. The wireless device of claim 6, wherein the transmission is performed by further transmitting of a second data signal or a second RS in a first symbol of the sidelink subframe,
wherein the transmitting the second data signal or the second RS is repeated in one or more REs with a periodicity of $N_{RPT\_0}$.

10. The wireless device of claim 9,
wherein the one or more REs having the periodicity of $N_{RPT\_0}$ in the first symbol have a boosted transmit power than the normal power of the other REs, and wherein the transmit power of the one or more REs having the periodicity of $N_{RPT\_0}$ in the first symbol is boosted by multiplying the normal power of the other REs by $N_{RPT_0\_}$.

* * * * *